(12) United States Patent
Chun et al.

(10) Patent No.: US 11,543,253 B2
(45) Date of Patent: Jan. 3, 2023

(54) APPARATUS AND METHOD FOR RECOMMENDING A DESTINATION

(71) Applicants: HYUNDAI MOTOR COMPANY, Seoul (KR); KIA MOTORS CORPORATION, Seoul (KR)

(72) Inventors: Chang Woo Chun, Suwon-si (KR); Seung Shin Lee, Seoul (KR); Soon Kwon Paik, Yongin-si (KR); Sung Soo Park, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 239 days.

(21) Appl. No.: 16/864,499

(22) Filed: May 1, 2020

(65) Prior Publication Data

US 2021/0164795 A1 Jun. 3, 2021

(30) Foreign Application Priority Data

Dec. 3, 2019 (KR) .......................... 10-2019-0159274

(51) Int. Cl.
*G01C 21/34* (2006.01)
*G06N 7/00* (2006.01)
*G07C 5/00* (2006.01)
*G07C 5/02* (2006.01)

(52) U.S. Cl.
CPC ......... *G01C 21/3484* (2013.01); *G06N 7/005* (2013.01); *G07C 5/008* (2013.01); *G07C 5/02* (2013.01)

(58) Field of Classification Search
USPC ........................................................ 701/411
See application file for complete search history.

(56) References Cited

U.S. PATENT DOCUMENTS

2011/0238289 A1* 9/2011 Lehmann ........... G01C 21/3617
701/533
2013/0238241 A1* 9/2013 Chelotti ............... G06Q 10/109
701/538

* cited by examiner

*Primary Examiner* — Tyler D Paige
(74) *Attorney, Agent, or Firm* — Lempia Summerfield Katz LLC

(57) ABSTRACT

A destination recommending apparatus includes: a navigation device configured to collect driving pattern information of a user; and a controller configured to calculate a visit probability of a destination at a current location or the visit probability of the destination at a current time, based on the driving pattern information. The controller is configured to predict the destination based on the visit probability.

15 Claims, 12 Drawing Sheets

APPARATUS AND METHOD FOR RECOMMENDING A DESTINATION

CROSS-REFERENCE TO RELATED APPLICATION

This application claims the benefit of priority to Korean Patent Application No. 10-2019-0159274, filed in the Korean Intellectual Property Office on Dec. 3, 2019, the entire contents of which are incorporated herein by reference.

TECHNICAL FIELD

The present disclosure relates to an apparatus for recommending a destination, a system including the same, and a method thereof.

BACKGROUND

A navigation device receives location information from a plurality of global positioning systems (GPS) to calculate a location, and maps the current location to the location to display the mapped result. When a destination is entered by a user, the navigation device searches for a path from a current location to a destination depending on a path search algorithm and matches the searched path with a map to display the path. Accordingly, the navigation device guides the path from the current location to the destination.

As the functions of navigation devices are upgraded, a function that recommends a recent destination or a frequent destination when the user sets a new destination has been recently added in addition to a function that guides the path to the destination. However, for the purpose of improving the quality of recommendations, the technology for providing the user with the function of recommending the customized destinations has been developed insufficiently.

SUMMARY

The present disclosure has been made to solve the above-mentioned problems occurring in the prior art while advantages achieved by the prior art are maintained intact.

An aspect of the present disclosure provides a destination recommending apparatus that predicts a destination capable of being selected by a user and a system and a method including the same.

The technical problems to be solved by the present inventive concept are not limited to the aforementioned problems. Any other technical problems not mentioned herein should be clearly understood from the following description by those of ordinary skill in the art to which the present disclosure pertains.

According to an aspect of the present disclosure, a destination recommending apparatus includes: a navigation device configured to collect driving pattern information of a user; and a controller coupled to the navigation device. The controller is configured to calculate a visit probability of a destination at a current location or the visit probability of the destination at a current time, based on the driving pattern information. The controller is configured to predict the destination based on the visit probability.

The controller calculates a location similarity probability between the current location and a plurality of points of interest (POIs) when the plurality of POIs is collected based on the driving pattern information. The controller calculates a visit probability of the plurality of POIs at the current location based on the location similarity probability and the visit probability of the POIs. Throughout the specification, a POI refers to a point of interest, a destination, or the like.

The controller calculates a time similarity probability between the current time and a time at which a plurality of POIs is set to the destination when the plurality of POIs are collected based on the driving pattern information. The controller calculates a visit probability of the plurality of POIs at the current time based on the time similarity probability and the visit probability of the POIs.

The controller recalculates the visit probability by reflecting an aging rate to a previously calculated visit probability when the previously calculated visit probability is present.

The controller determines whether the recalculated visit probability is less than a reference value and deletes a POI in which the visit probability is calculated to be less than the reference value, when the visit probability is less than the reference value.

The controller recalculates the visit probability by assigning a weight to the visit probability calculated to be greater than or equal to the reference value, when the visit probability is not less than the reference value.

The controller calculates location-based recommendation reliability or time-based recommendation reliability depending on whether the user selects the predicted destination and determines whether to recommend the predicted destination, based on the recommendation reliability.

The controller assigns a predetermined probability to all POIs to calculate the visit probability or to calculate the visit probability based on at least one of a pre-stored point, a destination selected by all users, and/or a destination selected by a similar user or a neighboring user, when the current location is a new visit. The controller predicts the destination based on the visit probability.

The controller determines whether the user is an effective user, based on a visit probability of the user for the predicted destination or the driving pattern information and recommends the predicted destination to the effective user when it is determined that the user is the effective user.

According to an aspect of the present disclosure, a destination recommending system includes: a vehicle configured to transmit a current location or a current time information and driving pattern information to a server; and the server configured to calculate a visit probability of a destination at the current location or the visit probability of the destination at the current time, based on the driving pattern information. The server is configured to predict the destination based on the calculated probability.

According to an aspect of the present disclosure, a destination recommending method includes: collecting driving pattern information of a user; calculating a visit probability of a destination at a current location or the visit probability of the destination at a current time, based on the driving pattern information; and predicting the destination based on the visit probability.

The calculating of the visit probability of the destination at the current location includes: calculating a location similarity probability between the current location and a plurality of POIs when the plurality of POIs are collected based on the driving pattern information; and calculating a visit probability of the plurality of POIs at the current location based on the location similarity probability and the visit probability of the POIs.

The calculating of the visit probability of the destination at the current time includes calculating a time similarity probability between the current time and a time at which a plurality of POIs is set to the destination when the plurality of POIs is collected based on the driving pattern information. The method includes calculating the visit probability of the plurality of POIs at the current time based on the time similarity probability and the visit probability of the plurality of POIs.

The method further includes, after the calculating of the visit probability of the destination at the current location or the visit probability of the destination at a current time, recalculating the visit probability by reflecting an aging rate to a previously calculated visit probability when the previously calculated visit probability is present.

The method further includes determining whether the recalculated visit probability is less than a reference value and deleting a POI in which the visit probability is calculated to be less than the reference value, when the visit probability is less than the reference value.

The method further includes, after the calculating of the visit probability of the destination at the current location or the visit probability of the destination at a current time, recalculating the visit probability by assigning a weight to the visit probability calculated to be greater than or equal to the reference value, when the visit probability is not less than the reference value.

The method further includes, after the predicting of the destination based on the visit probability: calculating a location-based recommendation reliability or a time-based recommendation reliability depending on whether the user selects the predicted destination; and determining whether to recommend the predicted destination, based on the recommendation reliability.

The predicting of the destination based on the visit probability includes: assigning a predetermined probability to the plurality of POIs to calculate the visit probability or to calculate the visit probability based on at least one of a pre-stored point, a destination selected by all users, and/or a destination selected by a similar user or a neighboring user, when the current location is a new visit; and predicting the destination based on the visit probability.

The method further includes determining whether the user is an effective user, based on a visit probability of the user for the predicted destination or the driving pattern information. The method includes recommending the predicted destination to the effective user when it is determined that the user is the effective user.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Figure 1:
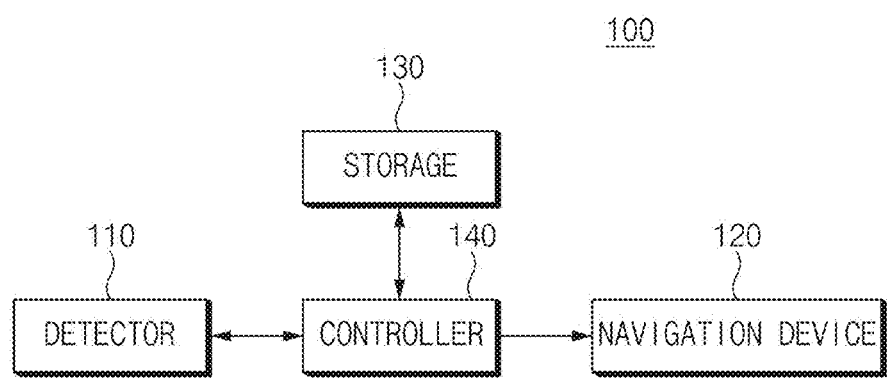
FIG. 1 is a block diagram illustrating a configuration of a destination recommending apparatus, according to an embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions is ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component. The terms do not limit the nature, sequence or order of the constituent components. Unless otherwise defined, all terms used herein, including technical or scientific terms, have the same meanings as those generally understood by those of ordinary skill in the art to which the present disclosure pertains. Such terms as those defined in a generally used dictionary are to be interpreted as having meanings equal to the contextual meanings in the relevant field of art. Such terms are not to be interpreted as having ideal or excessively formal meanings unless clearly defined as having such in the present application.

FIG. 1 is a block diagram illustrating a configuration of a destination recommending apparatus, according to an embodiment of the present disclosure.

As illustrated in FIG. 1, a destination recommending apparatus 100 may include a detector 110, a navigation device 120, a storage 130, and a controller 140.

The detector 110 may detect vehicle driving information of a user. In this example, the vehicle driving information of the user may include the distance driven, the driving time, ignition ON/OFF time, the location, or the like of the vehicle. To this end, the detector 110 may be implemented with at least one or more sensors. For example, the sensor may include an ignition sensor. The ignition sensor refers to a sensor that measures the current flowing through an ignition coil of the vehicle.

The navigation device 120 may collect a driving pattern information of the user. Herein, the driving pattern information of the user may include the number of times that the navigation is used, the average number of times that the navigation is used monthly, the number of times that POI is found monthly, the total number of POIs with visit history, POI distribution, a POI search ratio, POI revisit probability, or the like. In addition, the navigation device 120 may receive the current location of the vehicle by including a GPS receiver. The navigation device 120 may provide a map image information of a specific area, road guide image information, road guide voice information, speed information of the vehicle, destination information, and the like based on the current location of the vehicle. The destination information may be provided to the user in the form of a map, text, or various symbols. The navigation device 120 may guide and provide the path to the destination to the user.

The navigation 120 may include: a separate output device to provide the user with various pieces of information calculated or predicted from the controller 140. In an example, the output device may be implemented with a display device and a sound output device. The display device may visually display various information generated from the controller 140. In more detail, the display device may display information about the selectable destination predicted from the controller 140 and the path to the destination, the expected waiting time, the total required time, or the like. The display device may be implemented using a touch screen panel. According to an embodiment of the present disclosure, the display device may be integrally implemented with the display part. The sound output device may acoustically output various information generated from the controller 140. For example, the selectable destination predicted from the controller 140 may be provided to the user in the form of voice. The sound output devices may be implemented using a speaker and related parts.

The storage 130 may store at least one or more algorithms for the operation of the destination recommending apparatus according to an embodiment of the present disclosure. In addition, the storage 130 may store a POI (destination) visit information of a user during a predetermined period. In this example, the POI visit information of a user may include location information of the POI visited by a driver during a predetermined period, time information when the POI is found, the POI (destination) name, the GPS coordinates of the POI, the address, and the like. The storage 130 may include at least one storage medium of a flash memory, a hard disk, a memory card, a Read-Only Memory (ROM), a Random Access Memory (RAM), an Electrically Erasable Programmable Read Only Memory (EEPROM), a Programmable Read-Only Memory (PROM), a magnetic memory, a magnetic disk, and/or an optical disc.

The controller 140 may be coupled to the memory or storage 130. The controller 140 may be implemented by various processing devices such as a microprocessor equipped with a semiconductor chip or the like capable of performing or executing various computer-executable instructions stored in the storage 130. The controller 140 may control the operation of the destination recommending apparatus according to an embodiment of the present disclosure. In detail, the controller 140 may calculate the visit probability of the destination at the current location or the visit probability of the destination at the current time, based on the driving pattern information obtained from the navigation 120. The controller 140 may then predict the destination based on the calculated probability. The controller 140 may generate a location-based destination recommendation algorithm (model) to calculate the visit probability of the destination at the current location. Then, the controller 140 may calculate the visit probability of the destination at the current location based on the location-based destination recommendation algorithm (model). Moreover, the controller 140 may calculate a time-based destination recommendation algorithm (model) to calculate the visit probability of the destination at the current time. Then, the controller 140 may calculate the visit probability of the destination at the current time based on the time-based destination recommendation algorithm (model). According to an embodiment of the present disclosure, the operation of calculating a visit probability of a destination at a current location based on a location-based destination recommendation algorithm (model) is described below. In more detail, the controller 140 may determine whether a plurality of POIs has been collected based on driving pattern information. In this example, the plurality may mean at least four or more. It may be understood that there is a history in which a user sets at least four or more destinations and then drives a vehicle, after the vehicle is delivered to the user.

When determining that a plurality of POIs has been collected, the controller 140 may calculate a location similarity probability. In this example, it should be understood that the location similarity probability indicates how similar the location of each of the collected plurality of POIs is to the current location. In an example shown in Table 1 below, the location similarity probability for a plurality of POIs is shown. In the example shown in Table 1, the controller 140 sets a plurality of POIs to points 'A, B, C, and D'. In this example, the controller 140 sets the POI closest to the current location among the points 'A, B, C, and D' to 'D'. In this example, the controller 140 sets the distance between: the current location and 'A' to 1, the current location and 'B' to 2; the current location and 'C' to 3; and between the current location and 'D' to 5. In this example, the location similarity probability may be shown in the third column of Table 1 below.

TABLE 1

|  | Distance from current location to POI location | Location similarity probability |
|---|---|---|
| Current location ↔ A | 1 | 1/1 |
| Current location ↔ B | 2 | 1/2 |
| Current location ↔ C | 3 | 1/3 |
| Current location ↔ D | 5 | 1/5 |

In other words, when it is assumed that the probability that the current location is 'A' is 100%, the controller 140 may calculate the probability that the current location is 'B', as 50%, may calculate the probability that the current location is 'C', as 30%, and may calculate the probability that the current location is 'D', as 20%. In addition, the controller 140 may calculate a destination visit probability at the current location, based on the location similarity probability calculated at the current location and the frequency of the visit to a plurality of POIs. The operation in which the controller 140 calculates the visit probability of the visit to point B at the current location is described below.

First of all, the controller 140 may obtain a probability (i) of the visit from point 'A' to point 'B', a probability (ii) of the visit from point 'B' to point 'B', a probability (iii) of the visit from point 'C' to point 'B', and a probability (iv) of the visit from point 'D' to point 'B', based on the driving pattern information obtained from the navigation device 120. In addition, the controller 140 may calculate a first value by multiplying the visit probability (i) by the location similarity probability that the current location is 'A', may calculate a second value by multiplying the visit probability (ii) by the location similarity probability that the current location is 'B', may calculate a third value by multiplying the visit probability (iii) by the location similarity probability that the current location is 'C', and may calculate a fourth value by multiplying the visit probability (iv) by the location similarity probability that the current location is 'D'. Then, the controller 140 may add the first to fourth values and then may calculate the visit probability of the visit from the current location to point B.

The controller 140 may calculate the visit probability of the visit to each POI at the current location based on the above-described operation and may predict the destination to be recommended to the user, based on the visit probability.

Furthermore, the controller 140 may finally calculate a recommendation reliability to recommend the customized destination to the user. To this end, when the user selects one of the recommended destinations, the controller 140 may calculate location-based recommendation reliability based on the selected result.

The controller 140 may calculate the location-based recommendation reliability in this manner: when the reliability exceeds the preset value, the controller 140 may determine to recommend to the user the destination expected at the current location. According to an embodiment, the controller 140 may control destination information to be output in a pop-up form through the display device of the navigation 120. For example, the controller 140 may control a recommendation destination name and the distance to the destination to be output together in a pop-up form and may control a message for suggesting a guide to the recommendation destination to be output in a pop-up form.

According to another embodiment of the present disclosure, the operation of calculating a visit probability of a destination at a current time based on a time-based destination recommendation algorithm is described. In this example, the time may include time information and information about day of the week. In more detail, the controller 140 may determine whether a plurality of POIs have been collected based on driving pattern information. Herein, the plurality may mean at least four or more. It may be understood that there is a history in which a user sets at least four or more destinations and then drives a vehicle, after the vehicle is delivered.

When determining that a plurality of POIs (points A, B, C, and D) have been collected, the controller 140 may calculate a time similarity probability. In this example, it may be understood that the time similarity probability indicates how similar the time, at which each of the plurality of POIs is set to the destination, is to the current time. In an example, Table 2 shown below shows a time similarity probability for various time points. In the example shown in Table 2, the controller 140 sets a time, which is the closest to the current time, to 'E' among time points, at which a plurality of POIs are set. In this example, the controller 140 sets a time between the current time to time 'E' to '1', the controller 140 sets a time from the current time to time 'F' to '2', the controller 140 sets a time from the current time to time 'G' to '3', and the controller 140 sets a time from the current time to time 'H' to '5'. The time similarity probability may be shown in the third column of Table 2 below.

TABLE 2

| | Time between current time and POI setting time | Time similarity probability |
|---|---|---|
| Current time ↔ E | 1 | 1/1 |
| Current time ↔ F | 2 | 1/2 |
| Current time ↔ G | 3 | 1/3 |
| Current time ↔ H | 5 | 1/5 |

In other words, when it is assumed that the probability that the current time is 'E' is 100%, the controller 140 may calculate the probability that the current time is 'F', as 50%, may calculate the probability that the current time is 'G', as 30%, and may calculate the probability that the current time is 'H', as 20%. Furthermore, the controller 140 may calculate a destination visit probability at the current time, based on the time similarity probability calculated at the current time and the frequency of the visit to a plurality of POIs. According to an embodiment, based on the driving pattern information obtained from the navigation device 120, the controller 140 may calculate a fifth value by multiplying a probability of visit to 'A' at time 'E' by a probability that the current time is time 'E'. The controller 140 may calculate a sixth value by multiplying a probability of visit to 'A' at time 'F' by a probability that the current time is time 'F'. The controller 140 may calculate a seventh value by multiplying a probability of visit to 'A.' at time 'G' by a probability that the current time is time 'G'. The controller 140 may calculate an eighth value by multiplying a probability of visit to 'A' at time 'H' by a probability that the current time is time 'H'. The controller 140 may calculate the visit probability of the visit to point 'A' at the current time by adding the fifth to eighth values.

The controller 140 may obtain the probability of the visit to the destination A, B, C, and D at time 'E', time 'F', time 'G', and time 'H' based on the above-described operation, respectively. Moreover, the controller 140 may predict the destination to be recommended to the user, based on the visit probability.

The controller 140 may finally calculate a recommendation reliability to recommend the customized destination to the user. To this end, the controller 140 may recommend destinations to the user in descending order in which the visit probability is high. When the user selects one of the recommended destinations, the controller 140 may calculate time-based recommendation reliability based on the selected result.

The controller 140 may calculate the time-based recommendation reliability in this manner: when the reliability exceeds the preset value, the controller 140 may determine to recommend to the user the destination expected at the current time. According to an embodiment, the controller 140 may control destination information to be output in a pop-up form through the display device of the navigation 120. For example, the controller 140 may control a recommendation destination name and the distance to the destination to be output together in a pop-up form and may control a message for suggesting a guide to the recommendation destination to be output in a pop-up form.

Also, the controller 140 may update the location-based destination recommendation algorithm (model) or the time-based destination recommendation algorithm (model). The update of the recommendation algorithm may refer to the update of the previously calculated visit probability. The controller 140 may calculate the visit probability again by reflecting the aging rate to the previously calculated visit probability. This is to ensure that the visit probability previously calculated as a high value is reduced as time goes on without being maintained as a high value. To this end, the controller 140 may set the aging rate to a value between 0 and 1 and may recalculate the visit probability by reflecting the aging rate to the previously calculated visit probability for each operation of calculating the visit probability for the new destination prediction.

Furthermore, to update the previously calculated visit probability, the controller 140 may recalculate the visit probability by reflecting the weight to the visit probability for the repeatedly visited POI. The recalculating of the visit probability by reflecting the weight is to increase the probability to be predicted as the destination for the continuously visited POI. To this end, the controller 140 may set the weight to a value between 1 and 2 and may recalculate the visit probability by reflecting the weight to the visit probability of the corresponding POI upon redundantly visiting the POI.

The controller 140 determines whether the destination visit probability recalculated by the above-described operation is less than a reference value. When determining that the recalculated destination visit probability is less than the reference value, the controller 140 may control the corresponding POI to be deleted from the list of POIs that need to calculate the visit probability. This is to reduce the amount of computation for calculating the destination visit probability for all POIs.

The controller 140 may update the previously calculated destination visit probability and then may update the destination visit probability at the current time or at current location. In this example, the controller 140 may perform an operation of updating the selected POI frequency at the current time and an operation of calculating the destination visit probability at the current time based on the updated POI frequency, as the update operation of the destination visit probability of the current time. In addition, the controller 140 may perform an operation of updating the selected POI frequency at the current location and an operation of calculating the destination visit probability at the current location based on the updated POI frequency, as the update operation of the destination visit probability of the current location.

Also, the controller 140 may update the previously calculated recommendation reliability. In other words, when the number of times that the user selects the destination recommended at the current time or at the current location increases, the controller 140 may increase location-based recommendation reliability or time-based recommendation reliability. On the other hand, when the number of times that the user selects the destination recommended at the current time or at the current location decreases, the controller 140 may decrease location-based recommendation reliability or time-based recommendation reliability.

The controller 140 may determine whether the current location is a new visit. When the current location is the new visit, the controller 140 may calculate a visit probability by assigning a collective probability to the entire POIs. Moreover, the controller 140 may calculate the visit probability based on the frequently visited points stored in advance by the user. Furthermore, the controller 140 may calculate the visit probability for the POI selected by the entire users. Also, the controller 140 may calculate the visit probability based on the POI selected by a similar user or a neighboring user at the current location. In this example, the similar user may mean a user having a similar tendency as the user. For example, the similar user may mean a user who owns the same type of vehicle as a type of vehicle ridden by the user.

Accordingly, when the current location is a new visit, the controller 140 may easily predict the destination even though the POI is not found in the new visit.

The controller 140 may determine an effective user according to another embodiment of the present disclosure. In detail, the controller 140 may calculate entropy based on a destination visit frequency and a visit probability. In this example, the entropy refers to the degree of disorder. As the degree of disorder increases, it is difficult to determine the effective user.

For example, when the visit frequency and the visit probability are the same for 5 POIs, because the user has the same visit frequency for 5 POIs, the controller 140 does not know which of the five POIs the user will visit. In this case, the controller 140 may determine that the entropy is high; it is difficult to determine that the user is the effective user. On the other hand, when the visit frequency and the visit probability for one of 5 POIs are greater than the other four POIs, the controller 140 may predict that the user will visit the POI with high visit frequency. In this case, the controller 140 may determine that the entropy is low. The controller 140 may determine that the user is the effective user.

The controller 140 may obtain not only an entropy calculation but also driving pattern information and navigation usage information of the user to determine an effective user. The controller 140 may calculate the determination value of the effective user based on the obtained result. In this example, for the purpose of calculating the determination value of an effective user, the controller 140 is not limited to obtaining the user driving pattern and the navigation usage information. As long as parameters have high correlation with entropy, the controller 140 additionally may obtain the parameters.

The controller 140 may determine whether the determination value of the effective user calculated by the above-described operation exceeds the reference value. When the controller 140 determines that the determination value of the effective user exceeds the reference value, the controller 140 may determine the user as an effective user. Moreover, the controller 140 may control the predicted destination to be recommended to the user determined as the effective user.

Figure 2:
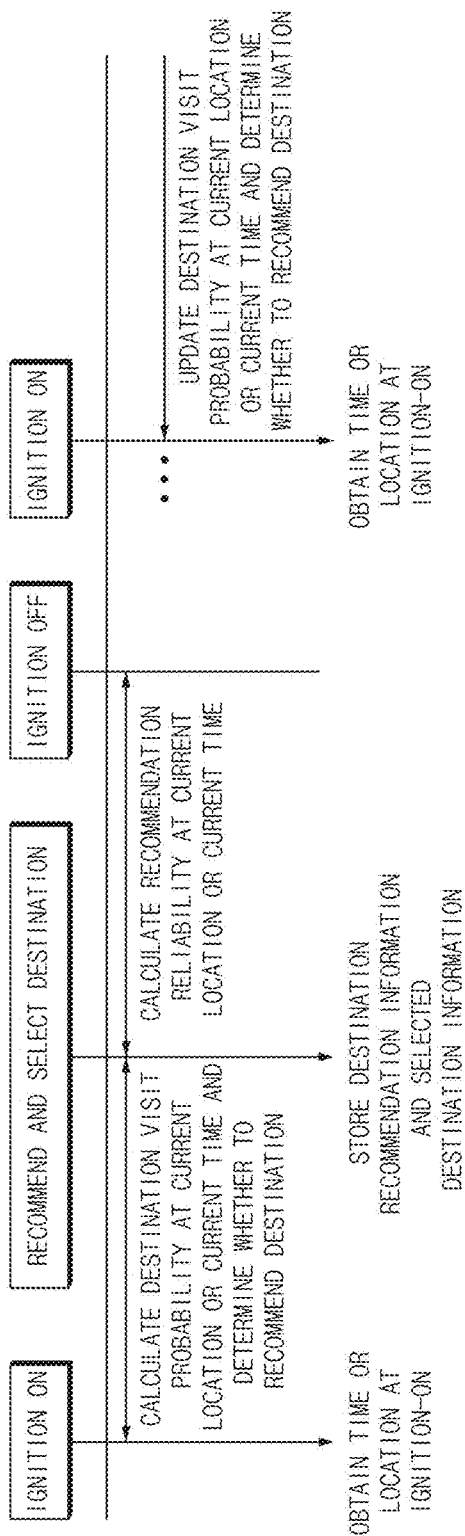
FIG. 2 is a diagram schematically illustrating a location or a time-based destination recommending method according to an ignition ON/OFF time of a vehicle, according to an embodiment of the present disclosure.

FIG. 2 is a diagram schematically illustrating a location or time-based destination recommending method according to an ignition ON/OFF time of a vehicle, according to an embodiment of the present disclosure.

As illustrated in FIG. 2, the controller 140 may obtain time information or location information at ignition-on time. The controller 140 may calculate a destination visit probability based on time information or location information at the ignition-on time and may determine whether to recommend a destination, based on the destination visit probability. When the controller 140 determines the destination recommendation, the controller 140 may output the destination in the pop-up form, according to an embodiment.

When the controller 140 determines that the recommended destination is selected by the user, the controller 140 may store the recommended destination information and the destination information selected by the user. In addition, when the user selects a destination, the controller 140 may calculate time-based recommendation reliability based on the selected result. When the ignition is turned on again after the ignition is turned off, the controller 140 may obtain time information or location information at the ignition-on time. Furthermore, the controller 140 may update the previously calculated destination visit probability, and then may determine whether to recommend a destination.

Figure 3:
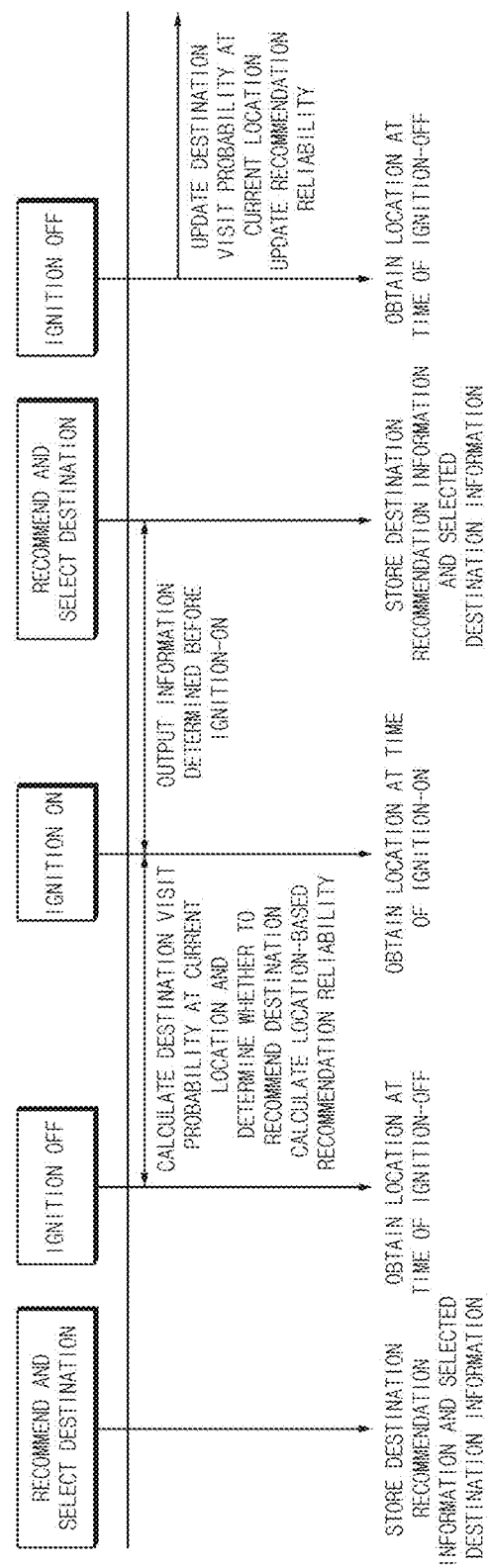
FIG. 3 is a diagram schematically illustrating a location-based destination recommending method according to an ignition ON/OFF time of a vehicle, according to another embodiment of the present disclosure.

FIG. 3 is a diagram schematically illustrating a location-based destination recommending method according to an ignition ON/OFF time of a vehicle, according to another embodiment of the present disclosure.

The controller 140 may control the recommended destination information and the selected destination to be stored in an ignition-on state. Moreover, when the ignition is turned off, the controller 140 may calculate a destination visit probability at the current location based on the information stored in the ignition-on state. Furthermore, the controller 140 may calculate location-based recommendation reliability based on the destination information selected in the ignition-on state. As such, when the controller 140 calculates the destination visit probability at the current location after the ignition is turned off and calculates the location-based recommendation reliability, the controller 140 may prevent an increase in load due to an arithmetic operation during the driving in the ignition-on state.

When the ignition is turned on, the controller 140 may control the recommended destination based on the destination visit probability and location-based recommendation reliability at the current location calculated in the ignition off state to be output. Also, the controller 140 may store the recommended destination information and the selected destination. When the ignition is turned off, the controller 140 may obtain the location of the ignition-off time. In addition, the controller 140 may recalculate the calculated destination visit probability, may calculate the destination visit probability at the current location at the ignition-off time to update the destination visit probability, and may update the recommendation reliability.

Figure 4:
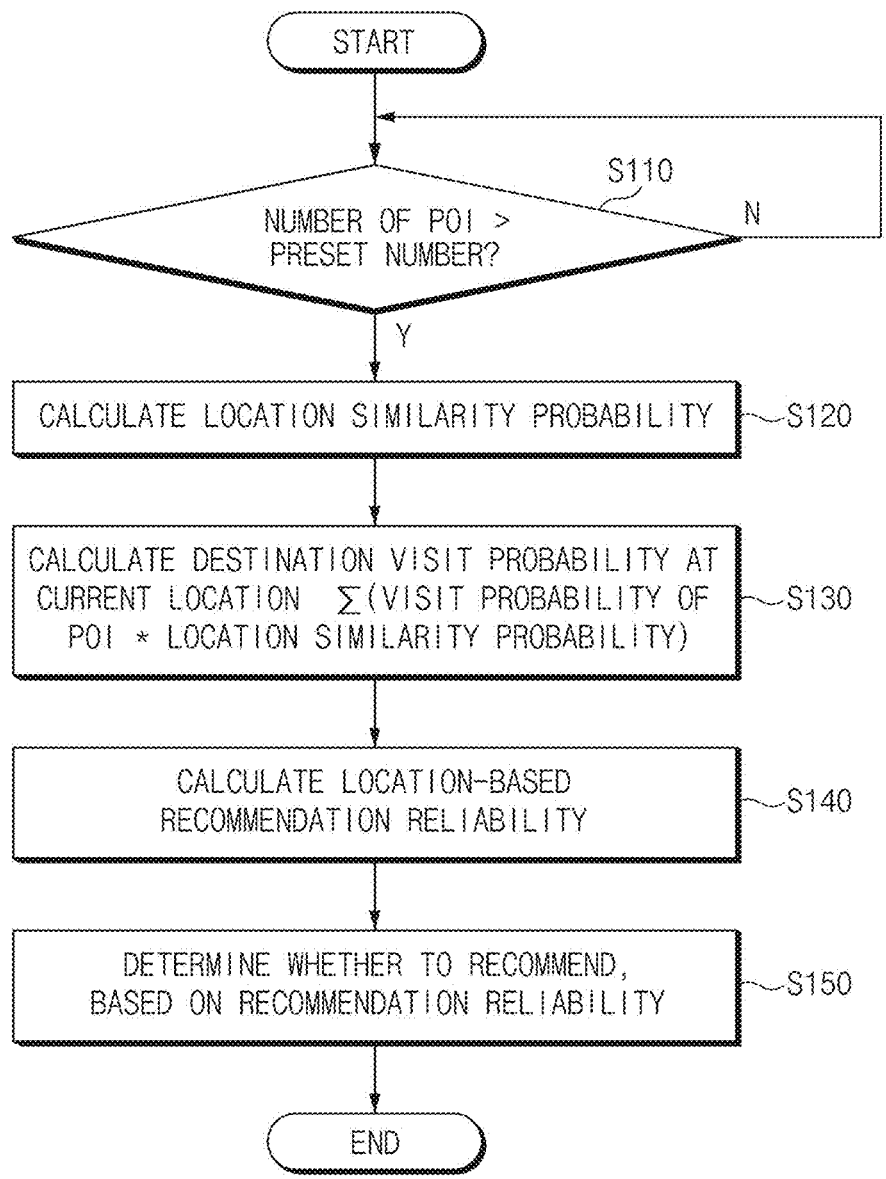
FIG. 4 is a flowchart illustrating a flow of a location-based destination recommending method, according to an embodiment of the present disclosure.

FIG. 4 is a flowchart illustrating a flow of a location-based destination recommending method, according to an embodiment of the present disclosure.

As illustrated in FIG. 4, the controller 140 determines whether the number of POIs collected based on driving pattern information exceeds a preset number (S110). The number preset in S110 refers to four. It may be understood that there is a history in which a user sets at least four or more destinations and then drives a vehicle, after the vehicle is delivered.

When the controller 140 determines that the number of collected POIs exceeds the preset number in S110 (Y), the controller 140 calculates the location similarity probability (S120). In the meantime, when the controller 140 determines that the number of collected POIs does not exceed the preset number in S110 (N), the controller 140 may control the POI to be collected until the number of collected POIs exceeds the preset number.

In S120, it may be understood that the location similarity probability indicates how similar the location of each of the collected plurality of POIs is to the current location. When the location similarity probability is calculated, the controller 140 calculates a destination visit probability at the current location based on the frequency (visit probability) of visiting a plurality of POIs collected in S110 (S130). In S130, the controller 140 may predict the destination to be recommended to a user, based on the calculated destination visit probability.

The controller 140 may calculate recommendation reliability to determine whether to recommend the predicted destination based on the destination visit probability calculated in S130 to the user (S140). When the user selects one of the recommended destinations, in S140, the controller 140 may calculate location-based recommendation reliability based on the selected result.

When the location-based recommendation reliability calculated in S140 exceeds a preset value, the controller 140 determines to recommend to the user the destination expected at the current location (S150). In S150, the controller 140 may control destination information to be output in a pop-up form through the display device of the navigation 120. For example, the controller 140 may control a recommendation destination name and the distance to the destination to be output together in a pop-up form and may control a message for suggesting a guide to the recommendation destination to be output in a pop-up form.

Figure 5:
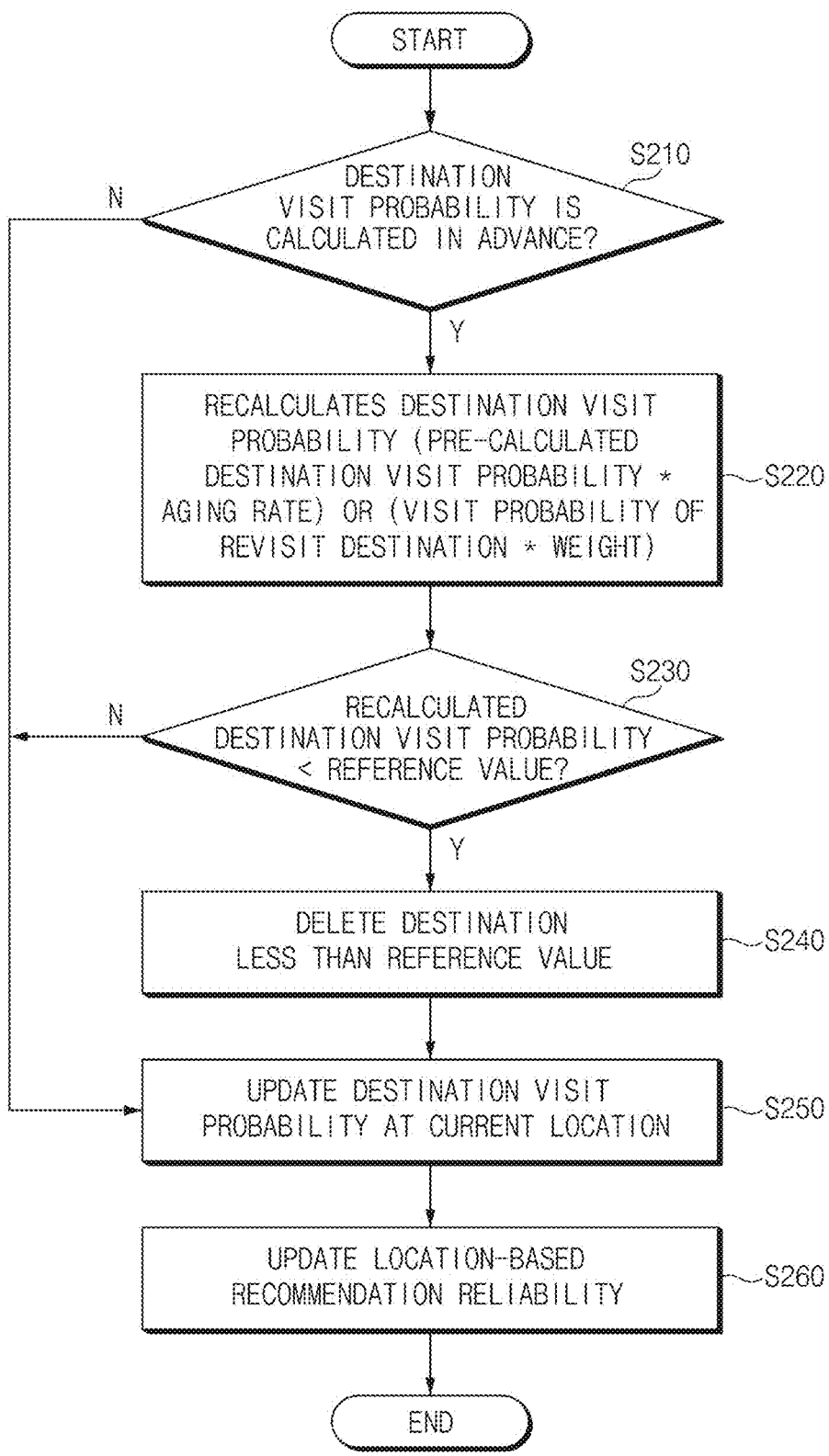
FIG. 5 is a flowchart illustrating a flow of a location-based destination recommendation updating method, according to an embodiment of the present disclosure.

FIG. 5 is a flowchart illustrating a flow of a location-based destination recommendation updating method, according to an embodiment of the present disclosure.

As illustrated in FIG. 5, the controller 140 determines whether the destination visit probability has been calculated in advance (S210). In S210, the controller 140 may determine whether there is a history in which the destination visit probability at the current location is calculated in S130 of FIG. 4.

When the controller 140 determines that the destination visit probability is calculated in advance in S210 (Y), the controller 140 recalculates the calculated destination visit probability (S220). In S220, the controller 140 may recalculate the visit probability by reflecting the aging rate to the calculated destination visit probability. This is to ensure that the visit probability previously calculated as a high value is reduced as time goes on without being maintained as a high value. To this end, the controller 140 may set the aging rate to a value between 0 and 1 and may recalculate the visit probability by reflecting the aging rate to the previously calculated visit probability for each operation of calculating the visit probability for the new destination prediction. Furthermore, in S220, the controller 140 may recalculate the visit probability by reflecting the weight to the visit probability for the repeatedly visited POI. The recalculating of the visit probability by reflecting the weight is performed to increase the probability to be predicted as the destination for the continuously visited POI. To this end, the controller 140 may set the weight to a value between 1 and 2 and may recalculate the visit probability by reflecting the weight to the visit probability of the corresponding POI upon redundantly visiting the POI.

The controller 140 determines whether the recalculated destination visit probability is less than a reference value (S230). When determining that the recalculated destination visit probability is less than the reference value in S230 (Y), the controller 140 may control the corresponding POI to be deleted from the list of POIs that need to calculate the visit probability (S240). This is to reduce the amount of computation for calculating the destination visit probability for all POIs.

The controller 140 may update the destination visit probability at the current location (S250). In S250, the controller 140 may perform an operation of updating the selected POI frequency at the current time and an operation of calculating the destination visit probability at the current time based on the updated POI frequency, as the update operation of the destination visit probability of the current location. In addition, the controller 140 may perform an operation of updating the selected POI frequency at the current location and an operation of calculating the destination visit probability at the current location based on the updated POI frequency, as the update operation of the destination visit probability of the current location.

Furthermore, the controller 140 may update the previously calculated recommendation reliability (the recommendation reliability calculated in S140 of FIG. 4) (S260). When the number of times that the user selects the destination recommended at the current location increases in S260, the controller 140 may increase location-based recommendation reliability. On the other hand, when the number of times that the user selects the destination recommended at current location decreases, the controller 140 may decrease location-based recommendation reliability or time-based recommendation reliability.

Figure 6:
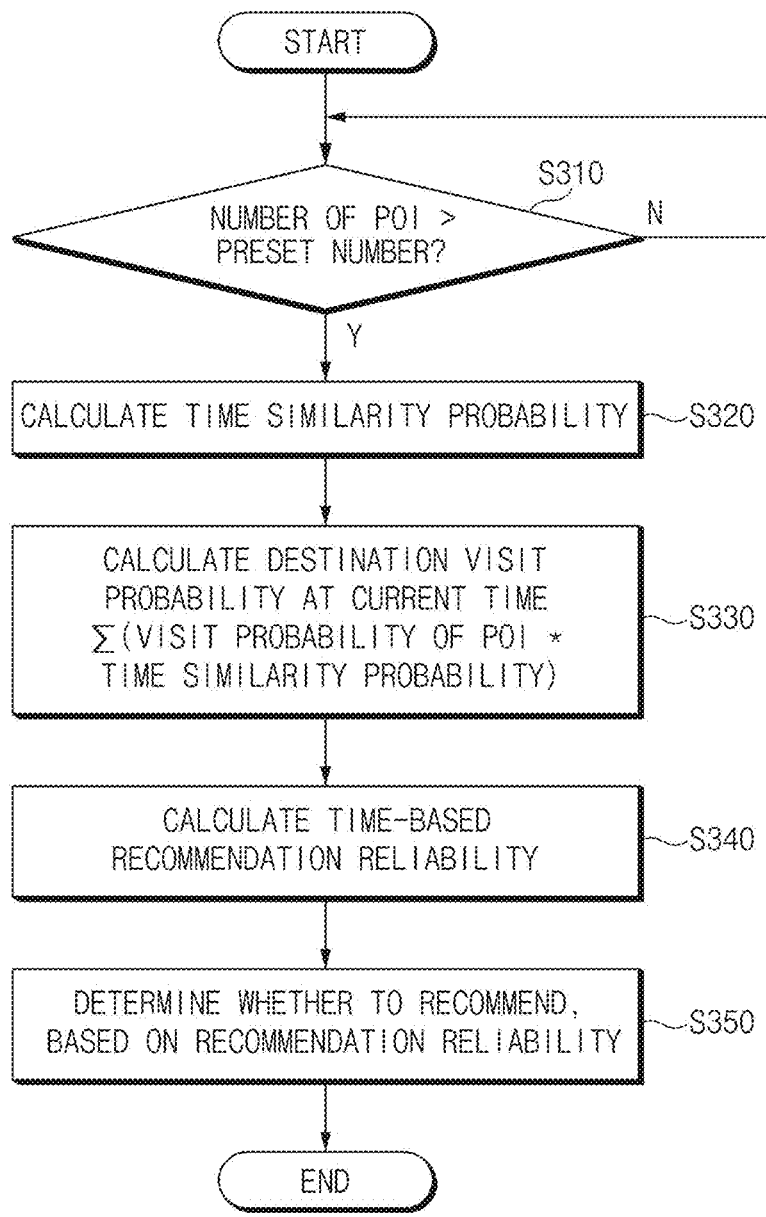
FIG. 6 is a flowchart illustrating a flow of a time-based destination recommending method, according to another embodiment of the present disclosure.

FIG. 6 is a flowchart illustrating a flow of a time-based destination recommending method, according to another embodiment of the present disclosure.

As illustrated in FIG. 6, the controller 140 determines whether the number of POIs collected based on driving pattern information exceeds a preset number (S310). The number preset in S310 refers to four. It may be understood that there is a history in which a user sets at least four or more destinations and then drives a vehicle, after the vehicle is delivered.

When the controller 140 determines that the number of collected POIs exceeds the preset number in S310 (Y), the controller 140 calculates the time similarity probability (S320). In the meantime, when the controller 140 determines that the number of collected POIs does not exceed the preset number in S310 (N), the controller 140 may control the POI to be collected until the number of collected POIs exceeds the preset number.

It may be understood that the time similarity probability indicates how similar the time, at which each of the plurality of POIs is set to the destination, is to the current time in S320. When the time similarity probability is calculated, the controller 140 calculates a destination visit probability at the current time based on the frequency (visit probability) of visiting a plurality of POIs collected in S310 (S330). In S330, the controller 140 may predict the destination to be recommended to a user, based on the calculated destination visit probability.

The controller 140 may calculate recommendation reliability to determine whether to recommend the predicted destination based on the destination visit probability calculated in S330 to the user (S340). When the user selects one of the recommended destinations, in S340, the controller 140 may calculate time-based recommendation reliability based on the selected result.

When the time-based recommendation reliability calculated in S340 exceeds a preset value, the controller 140 determines to recommend to the user the destination expected at the current location (S350). In S350, the controller 140 may control destination information to be output in a pop-up form through the display device of the navigation 120. For example, the controller 140 may control a recommendation destination name and the distance to the destination to be output together in a pop-up form and may control a message for suggesting a guide to the recommendation destination to be output in a pop-up form.

Figure 7:
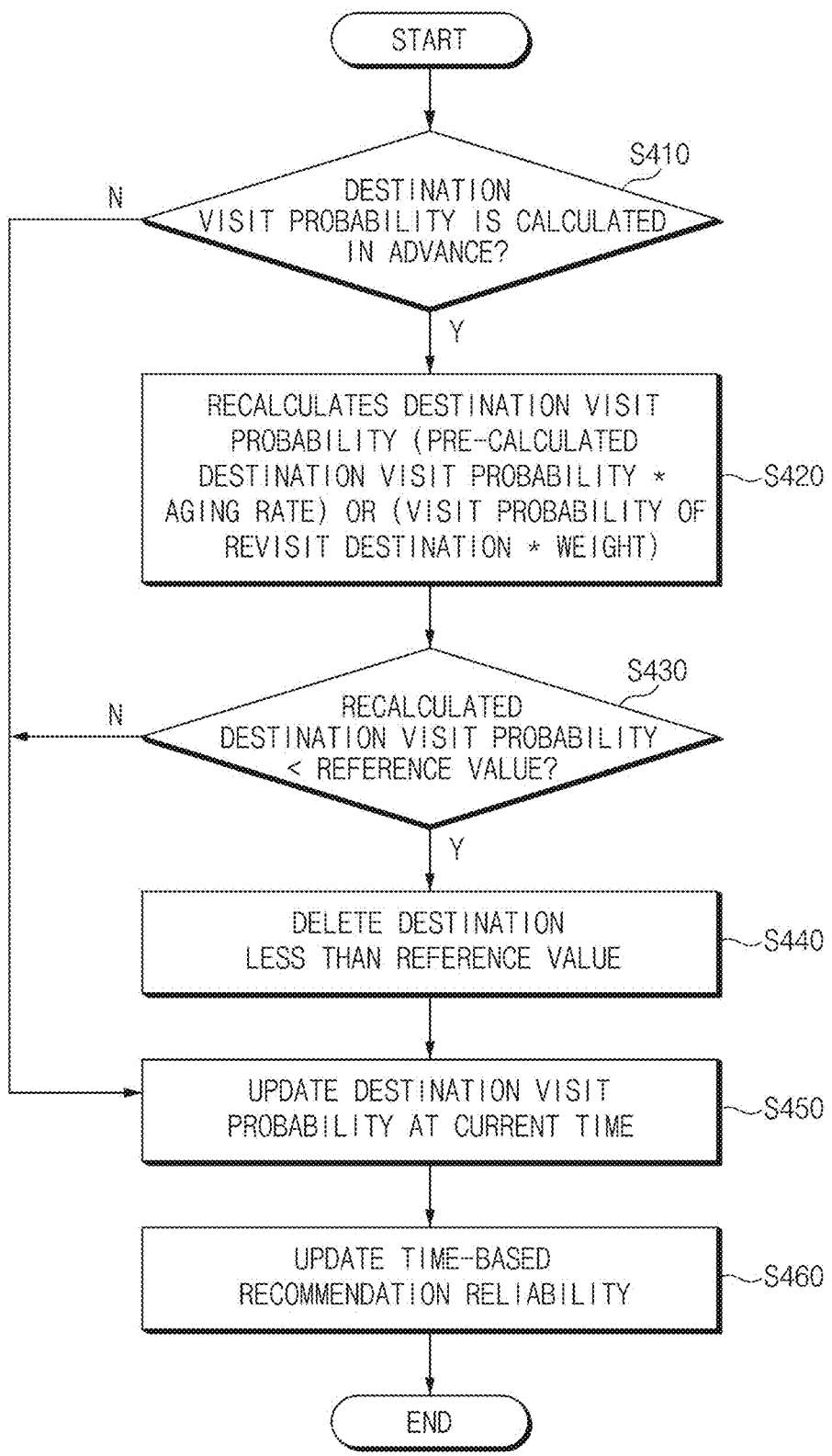
FIG. 7 is a flowchart illustrating a flow of a time-based destination recommendation updating method, according to another embodiment of the present disclosure.

FIG. 7 is a flowchart illustrating a flow of a time-based destination recommendation updating method, according to another embodiment of the present disclosure.

As illustrated in FIG. 7, the controller 140 determines whether the destination visit probability has been calculated in advance (S410). In S410, the controller 140 may determine whether there is a history in which the destination visit probability at the current location is calculated in S330 of FIG. 6.

When the controller 140 determines that the destination visit probability is calculated in advance in S410 (Y), the controller 140 recalculates the calculated destination visit probability (S420). In S420, the controller 140 may recalculate the visit probability by reflecting the aging rate to the calculated destination visit probability. This is to ensure that the visit probability previously calculated as a high value is reduced as time goes on without being maintained as a high value. To this end, the controller 140 may set the aging rate to a value between 0 and 1 and may recalculate the visit probability by reflecting the aging rate to the previously calculated visit probability for each operation of calculating the visit probability for the new destination prediction. Furthermore, in S420, the controller 140 may recalculate the visit probability by reflecting the weight to the visit probability for the repeatedly visited POI. The recalculating of the visit probability by reflecting the weight is to increase the probability to be predicted as the destination for the continuously visited POI. To this end, the controller 140 may set the weight to a value between 1 and 2 and may recalculate the visit probability by reflecting the weight to the visit probability of the corresponding POI upon redundantly visiting the POI.

The controller 140 determines whether the recalculated destination visit probability is less than a reference value (S430). When determining that the recalculated destination visit probability is less than the reference value in S430 (Y), the controller 140 may control the corresponding POI to be deleted from the list of POIs that need to calculate the visit probability (S440). This is to reduce the amount of computation for calculating the destination visit probability for all POIs.

The controller 140 may update the destination visit probability at the current time (S450). In S450, the controller 140 may perform an operation of updating the selected POI frequency at the current time and an operation of calculating the destination visit probability at the current time based on the updated POI frequency, as the update operation of the destination visit probability of the current time.

Furthermore, the controller 140 may update the previously calculated recommendation reliability (the recommendation reliability calculated in S340 of FIG. 6) (S460). When the number of times that the user selects the destination recommended at the current time increases in S460, the controller 140 may increase location-based recommendation reliability. On the other hand, when the number of times that the user selects the destination recommended at the current time or at the current location decreases, the controller 140 may decrease location-based recommendation reliability or time-based recommendation reliability.

Figure 8:
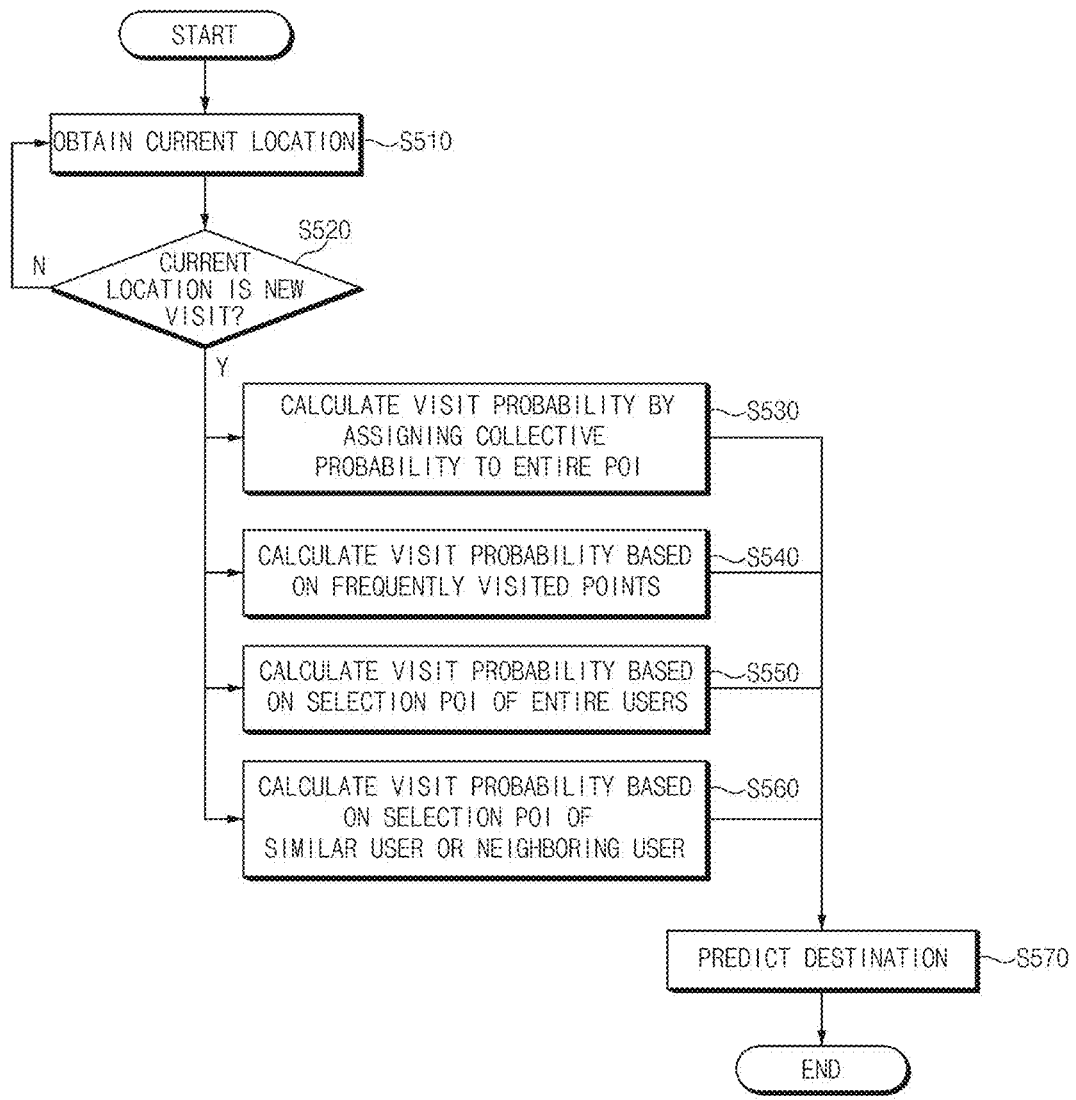
FIG. 8 is a flowchart illustrating a flow of a destination recommendation method in the case of a new visit, according to an embodiment of the present disclosure.

FIG. 8 is a flowchart illustrating a flow of a destination recommendation method in the case of a new visit, according to an embodiment of the present disclosure.

As illustrated in FIG. 8, the controller 140 obtains the current location from the navigation 120 (S510). The controller 140 determines whether the current location is a new visit (S520). When the controller 140 may determine that the current location is a new visit (Y) in S520, the controller 140 may calculate a visit probability by assigning a collective probability to the entire POIs (S530). Moreover, the controller 140 may calculate the visit probability based on the frequently visited points stored in advance by the user (S540). Furthermore, the controller 140 may calculate the visit probability for the POI selected by the entire users (S550). Also, the controller 140 may calculate the visit probability based on the POI selected by a similar user or a neighboring user at the current location (S560). In S560, the similar user may mean a user having a similar tendency as the user. For example, the similar user may mean a user who owns the same type of vehicle as a type of vehicle ridden by the user.

The controller 140 may predict the destination based on the visit probability calculated by the operation of one of S530 to S560 (S570). Accordingly, because the controller 140 may calculate the visit probability by at least one of S530 to S560, when the current location is a new visit, the controller 140 may easily predict the destination even though the POI is not found in the new visit.

Figure 9:
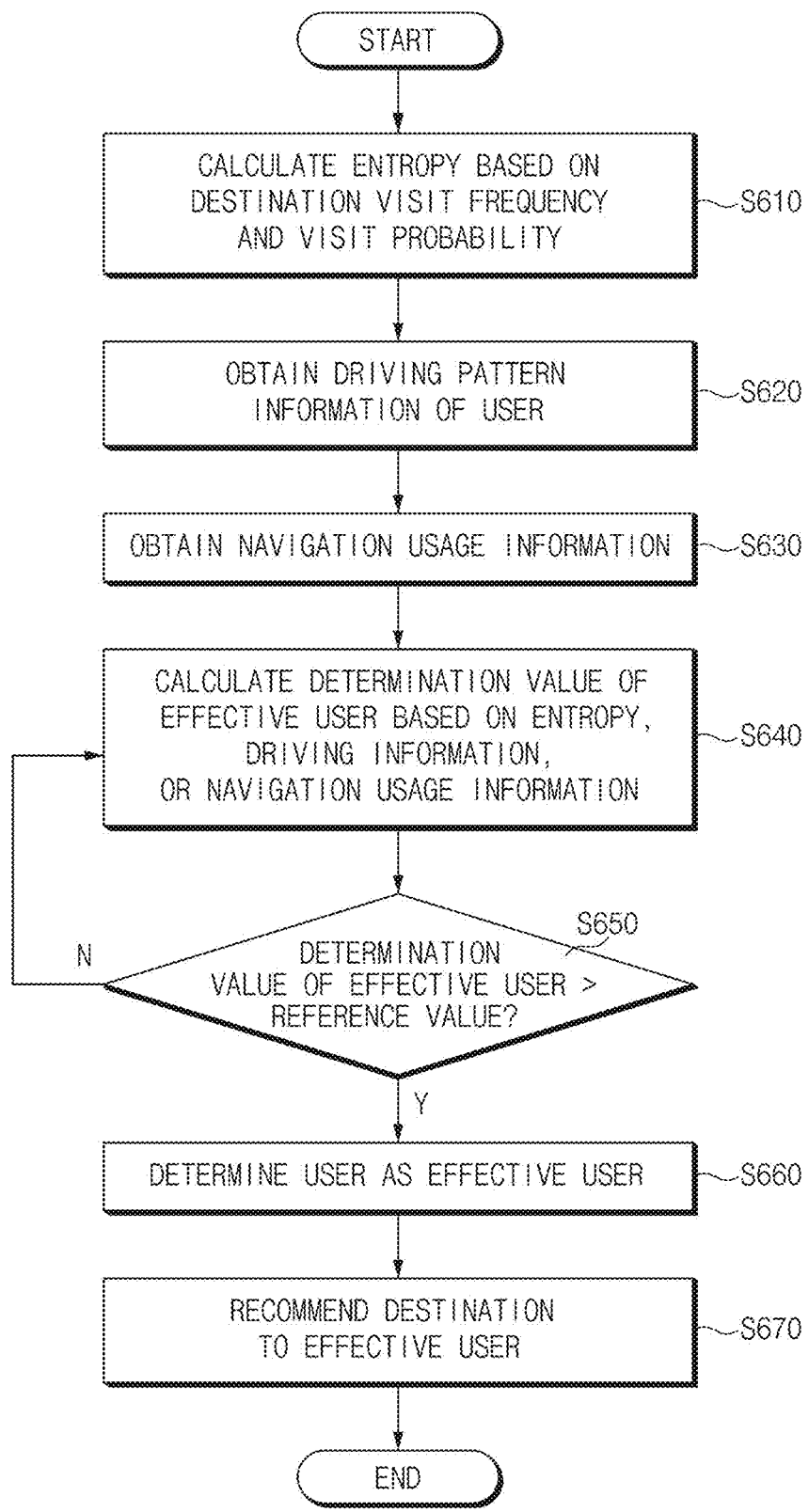
FIG. 9 is a flowchart illustrating a method of determining an effective user according to another embodiment of the present disclosure.

FIG. 9 is a flowchart illustrating a method of determining an effective user according to another embodiment of the present disclosure.

As illustrated in FIG. 9, the controller 140 calculates entropy based on a destination visit frequency and a visit probability (S610). In S610, the entropy refers to the degree of disorder. As the degree of disorder increases, it is difficult to determine the effective user. In S610, when the visit frequency and the visit probability are the same for 5 POIs, because the user has the same visit frequency for 5 POIs, the controller 140 does not know which of the five POIs the user will visit. In this case, the controller 140 may determine that the entropy is high; it is difficult to determine that the user is the effective user. On the other hand, when the visit frequency and the visit probability for one of 5 POIs are greater than the other four POIs, the controller 140 may predict that the user will visit POI with high visit frequency. In this case, the controller 140 may determine that the entropy is low; the controller 140 may determine that the user is the effective user.

The controller 140 obtains the user's driving pattern information and navigation usage information from the navigation device 120 (S620 and S630). The controller 140 may additionally obtain the parameters having high correlation with the entropy in the corresponding operation, in addition to the information obtained in S610 to S630.

The controller 140 calculates a determination value of an effective user based on the information obtained from S610 to S630 (S640). In addition, the controller 140 determines whether the determination value of the effective user exceeds a reference value (S650). When the controller 140 determines that the determination value of the effective user exceeds the reference value in S650 (Y), the controller 140 may determine the user as an effective user (S660). The controller 140 may control the predicted destination to be recommended to the user determined as the effective user (S670). When the controller 140 determines that the determination value of the effective user does not exceed the reference value in S650 (N), because the user is not regarded as the effective user, the controller 140 may not recommend the destination or may perform S640 again.

Figure 10:
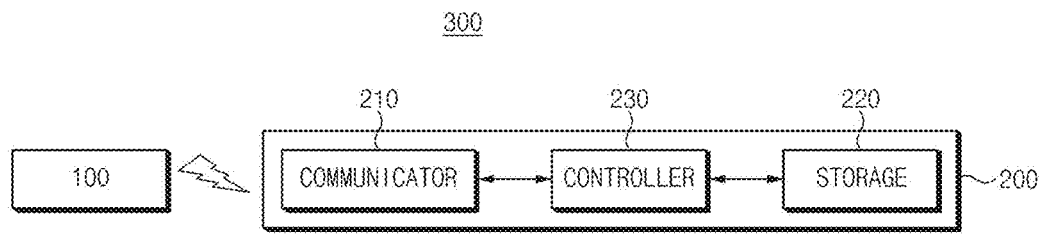
FIG. 10 is a block diagram illustrating a destination recommending system, according to an embodiment of the present disclosure.

FIG. 10 is a block diagram illustrating a destination recommending system, according to an embodiment of the present disclosure.

As illustrated in FIG. 10, a destination recommendation system 300 according to an embodiment of the present disclosure may include a vehicle 100 and a server 200 that communicates with the vehicle 100.

The vehicle 100 may further include a communicator (not shown) for communication with the server 200 in the configuration of FIG. 1. The communicator may be connected or coupled to the server 200 in a wireless manner so as to transmit the information obtained from the detector 110 and the navigation device 120 of FIG. 1 to the server 200. In addition, the communicator may receive information generated from the server 200. For example, the communicator may communicate with the server 200 in various wireless communication schemes such as Wi-Fi, Wibro, Global System for Mobile (GSM) communication, Code Division Multiple Access (CDMA), Wideband Code Division Multiple Access (WCDMA), Universal Mobile Telecommunication System (UMTS), Time Division Multiple Access (TDMA), Long Term Evolution (LTE), and the like.

In addition, the server 200 communicating with the vehicle 100 may include a communicator 210, a controller 230, and storage 220.

The communicator 210 may be connected wirelessly to the vehicle 100. The communicator 210 may receive information obtained from the detector 110 and the navigation 120 from the vehicle 100 and may transmit information generated by the controller 230 to the vehicle 100. For example, the communicator 210 may communicate with the vehicle 100 in various wireless communication schemes such as Wi-Fi, Wibro, Global System for Mobile (GSM) communication, Code Division Multiple Access (CDMA), Wideband Code Division Multiple Access (WCDMA), Universal Mobile Telecommunication System (UMTS), Time Division Multiple Access (TDMA), Long Term Evolution (LTE), and the like.

The storage 220 may store at least one or more algorithms for the operation of the destination recommending system according to an embodiment of the present disclosure. Furthermore, the storage 220 may store information received from the vehicle 100. The storage 220 may include at least one storage medium of a flash memory, a hard disk, a memory card, a Read-Only Memory (ROM), a Random Access Memory (RAM), an Electrically Erasable Programmable Read Only Memory (EEPROM), a Programmable Read-Only Memory (PROM), a magnetic memory, a magnetic disk, and/or an optical disc.

The controller 230 may be implemented by various processing devices such as a microprocessor equipped with a semiconductor chip or the like capable of performing or executing various computer-executable instructions stored in the memory or storage 220. The controller 140 may control the operation of the destination recommending system according to an embodiment of the present disclosure. In detail, the controller 230 may calculate the visit probability of the destination at the current location based on a location-based destination recommendation algorithm (model) or the visit probability of the destination at the current time based on a location-based destination recommendation algorithm (model), based on the driving pattern information obtained from the navigation 120 of a vehicle. Then, the controller 140 may predict the destination based on the calculated probability. In this example, the location-based destination recommendation algorithm (model) and the time-based destination recommendation algorithm (model) may be stored in advance in the storage 220 and may be received and stored from the vehicle 100. Also, the controller 230 may update the location-based destination recommendation algorithm (model) and the time-based destination recommendation algorithm (model). The detailed operation of the controller 230 refers to the operation description of the controller 140 of FIG. 1.

Figure 11:
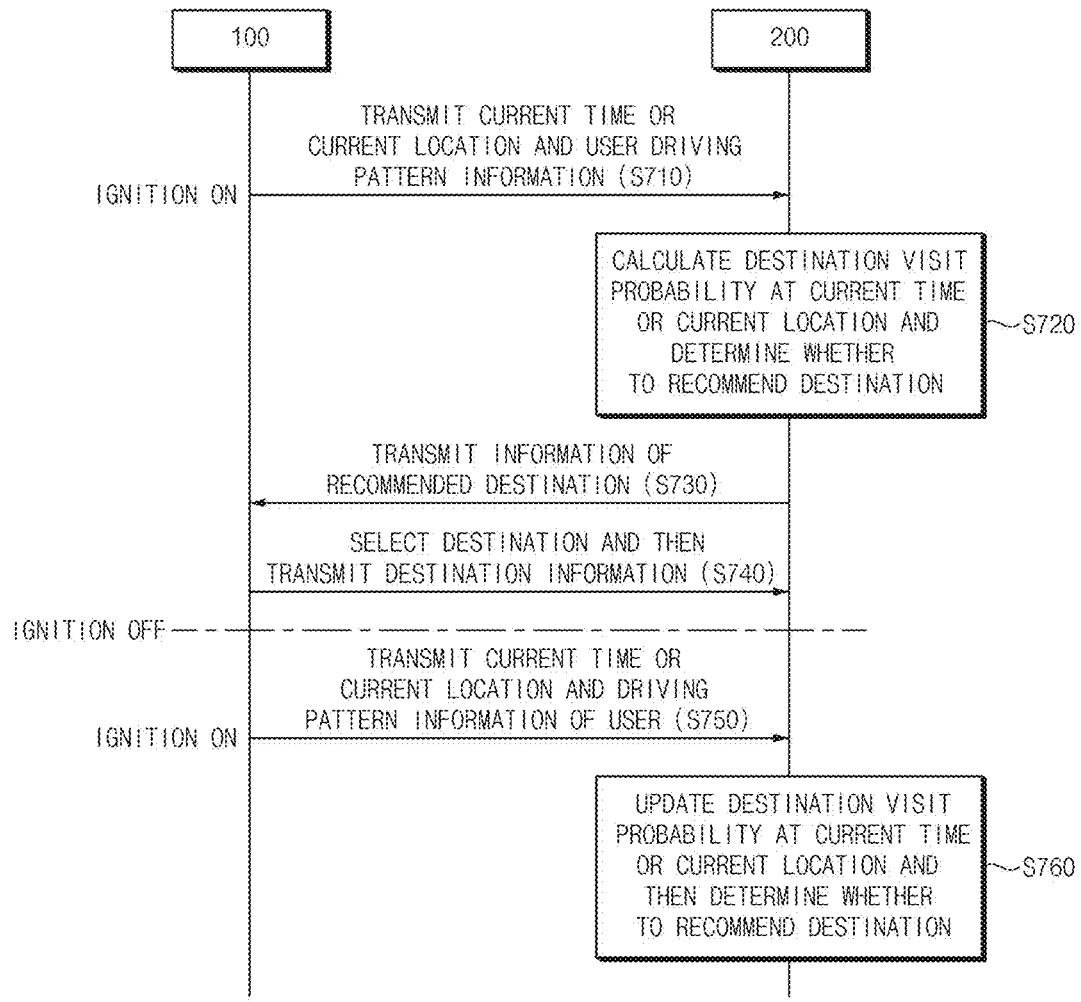
FIG. 11 is a flowchart illustrating the flow of operations of a destination recommending system, according to an embodiment of the present disclosure.

FIG. 11 is a flowchart illustrating the flow of operations of a destination recommending system, according to an embodiment of the present disclosure.

As illustrated in FIG. 11, the vehicle 100 transmits the current time or current location at ignition-on time and user driving pattern information, to the server 200 (S710). According to an embodiment, in S710, the vehicle 100 may transmit a location-based destination recommendation algorithm (model) and a time-based destination recommendation algorithm (model) to the server 200.

The server 200 may calculate a destination visit probability at the current time or the current location based on the location-based destination recommendation algorithm (model) or the time-based destination recommendation algorithm (model) based on the information received from the vehicle 100 and may determine whether to recommend a destination (S720). In this example, it may be understood that operation of S720 is the operation shown in FIG. 4 or 6, and the detailed descriptions refer to the description of FIG. 4 or 6.

The server 200 transmits the information of the recommended destination to the vehicle 100 (S730). The vehicle 100 selects the destination and then transmits the selected destination information to the server 200 (S740). When the ignition is turned off and then the ignition is turned on again, the vehicle 100 transmits the current time or the current location at ignition-on time and driving pattern information of the user to the server 200 (S750). According to an embodiment, because the location of the vehicle 100 is not changed after the ignition-off time, in S750, the vehicle 100 may transmit location information at the ignition-off time to the server 200. When the vehicle 100 transmits location information at the ignition-off time to the server 200 in S750, the vehicle 100 may transmit the driving pattern information of the user to the server 200 together. The server 200 updates the destination visit probability at the current time or the current location and then determines whether to recommend a destination (S760). In S760, the server 200 may update the location-based destination recommendation algorithm (model) and the time-based destination recommendation algorithm (model). In this example, it may be understood that operation of S760 is the operation shown in FIG. 5 or 7, and the detailed descriptions refer to the description of FIG. 5 or 7. After S760, the recommended destination may be transmitted to the vehicle based on the updated location-based destination recommendation algorithm (model) or the updated time-based destination recommendation algorithm (model).

Figure 12:
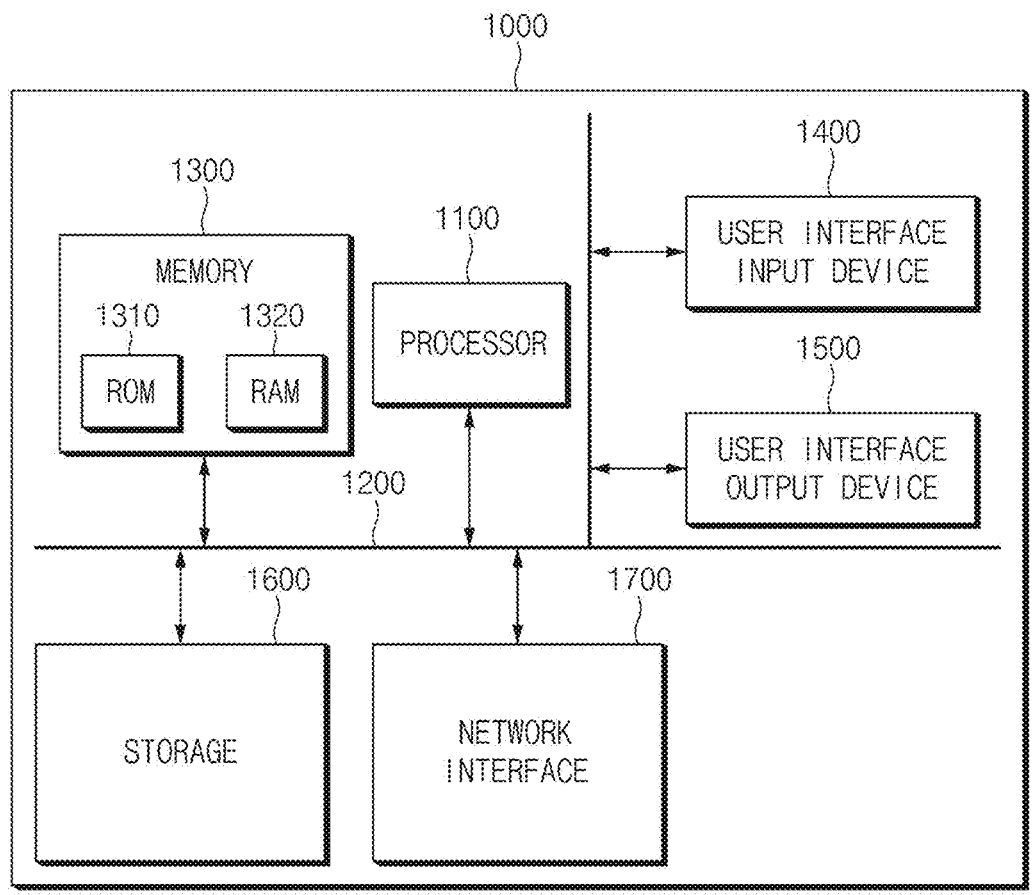
FIG. 12 is a block diagram illustrating a configuration of a computing system performing a method, according to an embodiment of the present disclosure.

FIG. 12 is a diagram illustrating a configuration of a computing system performing a method according to an embodiment of the present disclosure.

Referring to FIG. 12, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The storage medium may be coupled to the processor 1100. The processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

Hereinabove, although the present disclosure has been described with reference to various embodiments and the accompanying drawings, the present disclosure is not limited thereto, but may be variously modified and altered by those of ordinary skill in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims. All the technical ideas within the scope equivalent to the claims should be included in the scope of the present disclosure.

According to an embodiment of the present disclosure, a destination recommending apparatus may provide the personalized service to improve the satisfaction of the user and may increase convenience by predicting and recommending a selectable destination at the current location or the current time so as to be suitable for a user, and a system and a method that includes the same.

Hereinabove, although the present disclosure has been described with reference to various embodiments and the accompanying drawings, the present disclosure is not limited thereto, but may be variously modified and altered by those of ordinary skill in the art to which the present disclosure pertains without departing from the spirit and scope of the present disclosure claimed in the following claims.

What is claimed is:

1. A destination recommending apparatus, the apparatus comprising:
    a detector configured to detect an ignition-on time of a vehicle;
    a navigation device configured to receive a location of the vehicle at the ignition-on time, search a plurality of points of interest (POIs), and provide each path to the plurality of POIs; and
    a controller coupled to the navigation device and configured to calculate a visit probability of a destination at the location of the vehicle at the ignition-on time or a visit probability of a destination at the ignition-on time, based on a visit probability of the plurality of POIs at the location of the vehicle at the ignition-on time and a visit probability of the plurality of POIs at the ignition-on time and to predict the destination based on the visit probability,
    wherein the controller calculates a location similarity probability between the location of the vehicle at the ignition-on time and each point of the plurality of POIs and calculates the visit probability of the plurality of POIs at the location of the vehicle at the ignition-on time based on the location similarity probability and a probability of visiting one POI among the plurality of POIs from the each point of the plurality of POIs,
    wherein the controller calculates a time similarity probability between the ignition-on time and a time at which the plurality of POIs is set to the destination and calculates the visit probability of the plurality of POIs at the ignition-on time based on the time similarity probability and a probability of visiting one POI among the plurality of POIs at the time at which the plurality of POIs is set to the destination, and wherein the predicted destination is outputted to an output device included in the navigation device.

2. The apparatus of claim 1, wherein the controller recalculates the visit probability by reflecting an aging rate to a previously calculated visit probability when the previously calculated visit probability is present.

3. The apparatus of claim 2, wherein the controller determines whether the recalculated visit probability is less than a reference value and deletes a POI in which the visit probability is calculated to be less than the reference value, when the visit probability is less than the reference value.

4. The apparatus of claim 3, wherein the controller recalculates the visit probability by assigning a weight to the visit probability calculated to be greater than or equal to the reference value, when the visit probability is not less than the reference value.

5. The apparatus of claim 4, wherein the controller calculates location-based recommendation reliability or time-based recommendation reliability depending on whether the user selects the predicted destination and determines whether to recommend the predicted destination, based on the recommendation reliability.

6. The apparatus of claim 1, wherein the controller assigns a predetermined probability to the plurality of POIs to calculate the visit probability or to calculate the visit probability based on at least one of a pre-stored point, a destination selected by all users, and/or a destination selected by a similar user or a neighboring user, when the location of the vehicle at the ignition-on time is a new visit and predicts the destination based on the visit probability.

7. The apparatus of claim 1, wherein the controller determines whether the user is an effective user, based on a visit probability of the user for the predicted destination or a driving pattern information obtained from the navigation device and recommends the predicted destination to the effective user when it is determined that the user is the effective user.

8. A destination recommending system comprising:
a vehicle configured to detect an ignition-on time of a vehicle, receive a location of the vehicle at the ignition-on time, search a plurality of points of interest (POIs), provide each path to the plurality of POIs, and transmit the location of the vehicle at the ignition-on time or the ignition-on time, the plurality of searched POIs, and the each path to the plurality of POIs to a server; and the server coupled to the vehicle and configured to calculate a visit probability of a destination at the location of the vehicle at the ignition-on time or the visit probability of the destination at the ignition-on time, based on a visit probability of the plurality of POIs at the location of the vehicle at the ignition-on time and a visit probability of the plurality of POIs at the ignition-on time and to predict the destination based on the calculated probability, wherein the server calculates a location similarity probability between the location of the vehicle at the ignition-on time and each point of the plurality of POIs and calculates the visit probability of the plurality of POIs at the location of the vehicle at the ignition-on time based on the location similarity probability and a probability of visiting one POI among the plurality of POIs from the each point of the plurality of POIs, wherein the server calculates a time similarity probability between the ignition-on time and a time at which the plurality of POIs is set to the destination and calculates the visit probability of the plurality of POIs at the ignition-on time based on the time similarity probability and a probability of visiting one POI among the plurality of POIs at the time at which the plurality of POIs is set to the destination, and wherein the predicted destination is outputted to an output device included in the navigation device.

9. A destination recommending method, the method comprising:
detecting, by a detector, an ignition-on time of a vehicle;
receiving, by a navigation, a location of the vehicle at the ignition-on time;
searching, by the navigation, a plurality of points of interest (POIs);
providing, by the navigation device, each path to the plurality of POIs;
calculating, by a controller, a visit probability of a destination at the location of the vehicle at the ignition-on time or a visit probability of a destination at the ignition-on time, based on a visit probability of the plurality of POIs at the location of the vehicle at the ignition-on time and a visit probability of the plurality of POIs at the ignition-on time; and
predicting, by a controller, the destination based on the visit probability,
wherein the controller calculates a location similarity probability between the location of the vehicle at the ignition-on time and each point of the plurality of POIs and calculates the visit probability of the plurality of POIs at the location of the vehicle at the ignition-on time based on the location similarity probability and a probability of visiting one POI among the plurality of POIs from the each point of the plurality of POIs,
wherein the controller calculates a time similarity probability between the ignition-on time and a time at which the plurality of POIs is set to the destination and calculates the visit probability of the plurality of POIs at the ignition-on time based on the time similarity probability and a probability of visiting one POI among the plurality of POIs at the time at which the plurality of POIs is set to the destination, and
wherein the predicted destination is outputted to an output device included in the navigation device.

10. The method of claim 9, further comprising:
after the calculating of the visit probability of the destination at the location of the vehicle at the ignition-on time or the visit probability of the destination at the ignition-on time,
recalculating the visit probability by reflecting an aging rate to a previously calculated visit probability when the previously calculated visit probability is present.

11. The method of claim 10, further comprising:
determining whether the recalculated visit probability is less than a reference value; and
deleting a POI in which the visit probability is calculated to be less than the reference value, when the visit probability is less than the reference value.

12. The method of claim 11, further comprising:
after the calculating of the visit probability of the destination at the location of the vehicle at the ignition-on time or the visit probability of the destination at the ignition-on time,
recalculating the visit probability by assigning a weight to the visit probability calculated to be greater than or equal to the reference value, when the visit probability is not less than the reference value.

13. The method of claim 12, further comprising:
after the predicting of the destination based on the visit probability,
calculating location-based recommendation reliability or time-based recommendation reliability depending on whether the user selects the predicted destination; and
determining whether to recommend the predicted destination, based on the recommendation reliability.

14. The method of claim 9, wherein the predicting of the destination based on the visit probability includes:
assigning a predetermined probability to the plurality of POIs to calculate the visit probability or to calculate the visit probability based on at least one of a pre-stored point, a destination selected by all users, and/or a destination selected by a similar user or a neighboring user, when the location of the vehicle at the ignition-on time is a new visit; and
predicting the destination based on the visit probability.

15. The method of claim 9, further comprising:
determining whether the user is an effective user, based on a visit probability of the user for the predicted destination or a driving pattern information obtained from the navigation device; and
recommending the predicted destination to the effective user when it is determined that the user is the effective user.

* * * * *